_United States Patent Office_

3,117,132
Patented Jan. 7, 1964

3,117,132
**3-ACYL-9-METHYL-3,9-DIAZABICYCLO-
[4.2.1]NONANES**
Hans A. Wagner, Chicago, Ill., assignor to G. D.
Searle & Co., Chicago, Ill., a corporation of Delaware
No Drawing. Filed Jan. 4, 1962, Ser. No. 164,403
5 Claims. (Cl. 260—326.3)

This invention relates to 3-acyl-9-methyl-3,9-diazabicyclo[4.2.1]nonanes and processes for the preparation thereof. More particularly, this invention relates to new and useful chemical compounds of the formula

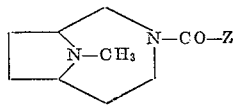

wherein Z represents an alkyl radical substituted by one or more carbocyclic radicals. Alternatively, Z represents an alkoxy radical.

Among the substituted alkyl radicals represented by Z in the foregoing formula, especially lower alkyl radicals wherein at least 1 hydrogen is replaced by a phenyl or cycloalkyl radical are preferred. By "lower alkyl radicals" is meant methyl, ethyl, propyl, isopropyl, butyl, isobutyl, sec-butyl, tert-butyl, pentyl, neopentyl, hexyl, isohexyl, and like —$C_nH_{2n+1}$ groupings wherein $n$ represents a positive integer less than 8. The cycloalkyl substituents most advantageously embraced by Z, for the purposes of this invention, are 5- and 6-membered groupings, namely, cyclopentyl and cyclohexyl radicals. It follows that diphenylmethyl, benzyl, phenylethyl, cyclohexylethyl, cyclopentylmethyl, and homologous radicals wherein the aliphatic constituent comprises no more than 7 carbon atoms are all eminently suitable embodiments of Z. Likewise optimally adapted embodiments of Z, for the purposes hereof, are lower alkoxy radicals, which is to say, groupings of the formula —O—lower alkyl Equivalent to the basic amines described above are the correspondingly useful acid addition and quaternary ammonium salts thereof having the formula

wherein Z is defined as before; Q is selected from among hydrogen and lower alkyl, hydroxy(lower alkyl), and lower alkenyl radicals, as also such aralkyl radicals as benzyl, phenylethyl, and naphthylethyl; and T represents one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in pharmaceutical dosage.

The compounds to which this invention relates are useful because of their valuable pharmacological properties. Thus, for example, they are anti-hypertensive; and, moreover, they are anti-inflammatory, being adapted to counteract the heat, swelling, and rubor characteristic of the inflammatory response to tissue insult. Further, the subject compounds are anti-biotics effective against bacteria such as *Diplococcus pneumoniae*, fungi such as *Trichophyton mentagrophytes*, algae such as *Chlorella vulgaris*, and cotyledenous seed germination. They also inhibit the incorporation of mevalonic acid during biosynthesis of cholesterol.

Preparation of the instant compounds proceeds by contacting 9-methyl - 3,9 - diazabicyclo[4.2.1]nonane in an inert solvent such as ether with a halide of the formula

X—CO—Z

X being representative of chlorine or bromine and Z being defined as before.

Conversion of the amine bases of this invention to corresponding acid addition salts is accomplished by simple admixture thereof with one equivalent of any of various inorganic and strong organic acids, the anionic portion of which conforms to T as hereinbefore defined.

The quaternary compounds comprehended are those derived by contacting a claimed amine base with an organic ester of the formula

QT

Q and T being limited by the meanings hereinabove assigned. Quaternization takes place in the temperature range between 25 and 100 degrees centigrade in an inert solvent medium such as chloroform, butanone, methanol, butanol, or the like, and is ordinarily completed in from 1 to 48 hours. The reaction is generally carried out in a closed system if a lower alkyl halide—such as methyl chloride—is one of the reagents. Using methyl bromide, the preparation of quaternary salts may be smoothly effected in butanone solution at 70 degrees centigrade after a reaction period of approximately 1 hour.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

A. *9-Methyl-3-diphenylacetyl - 3,9-diazabicyclo[4.2.1]-nonane.*—To a solution of 63 parts of diphenylacetyl chloride in 1000 parts of ether is slowly added, with vigorous agitation, a solution of 42 parts of 9-methyl-3,9-diazabicyclo[4.2.1]nonane [J. Org. Chem., 25, 637 (1960)] in 500 parts of ether. Agitation is continued for 1 hour after the addition is complete, at which point the solid precipitate formed in process is filtered off and taken up in 500 parts of water. The resultant solution is adjusted to a pH of 8 with concentrated aqueous sodium hydroxide, whereupon the solid which precipitates is filtered off and taken up in ether, and the filtrate is extracted with ether. The two ether solutions are combined, dried over anhydrous calcium sulfate, and stripped of solvent by distillation. The residue, recrystallized from hexane, affords 9-methyl - 3 - diphenylacetyl - 3,9 - diazabicyclo[4.2.1]-nonane melting at approximately 106°. The product has the formula

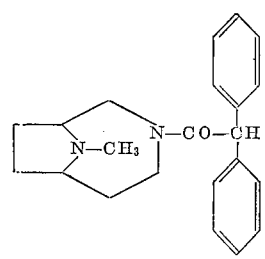

B. *9-(p-bromobenzoylmethyl) - 9 - methyl - 3 - diphenylacetyl - 3 - aza - 9 - azoniabicyclo[4.2.1]nonane bromide.*—A solution of 167 parts of 9-methyl-3-diphenylacetyl - 3,9 - diazabicyclo[4.2.1]nonane and 139 parts of p-bromophenylacetyl bromide in 2000 parts of ethanol is heated at the boiling point under reflux for 5 hours, then allowed to stand at room temperatures overnight, and finally poured into 30,000 parts of ether. The solid precipitate which forms is filtered off and washed with ether. Recrystallized from a mixture of ethanol and ethyl acetate, it affords 9-(p-bromobenzoylmethyl) - 9 - methyl-3-diphenylacetyl - 3 - aza - 9 azoniabicyclo[4.2.1]nonane bromide melting at approximately 149°.

EXAMPLE 2

*9-methyl - 3 - phenylacetyl - 3,9 - diazabicyclo[4.2.1]nonane.*—To a solution of 45 parts of phenylacetyl chloride in 1000 parts of ether is added, with vigorous agitation, a solution of 42 parts of 9-methyl-3,9-diazabicyclo-[4.2.1]nonane in 500 parts of ether. Agitation is continued for 1 hour after the addition is complete, at which point the reaction mixture is partitioned between aqueous sodium hydroxide and ether. The ethereal phase is dried over anhydrous calcium sulfate and stripped of solvent by distillation. The residue is 9-methyl-3-phenylacetyl-3,9-diazabicyclo[4.2.1]nonane, having the formula

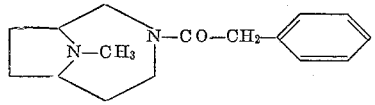

EXAMPLE 3

*3-cyclohexylacetyl - 9 - methyl - 3,9 - diazabicyclo-[4.2.1]nonane.*—Substitution of 47 parts of cyclohexaneacetyl chloride for the phenylacetyl chloride called for in Example 2 affords, by the procedure there detailed, 3-cyclohexylacetyl - 9 - methyl - 3,9 - diazabicyclo[4.2.1]-nonane, having the formula

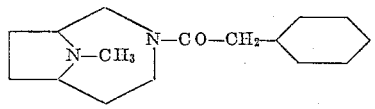

EXAMPLE 4

*3-(3-cyclopentylpropionyl) - 9 - methyl - 3,9 - diazabicyclo[4.2.1]nonane hydrochloride.*—To a solution of 32 parts of 3-cyclopentylpropionyl chloride in 750 parts of ether is added, with vigorous agitation, a solution of 9-methyl - 3,9 - diazabicyclo[4.2.1]nonane in 400 parts of ether. When the addition is complete, agitation is continued for 1 hour longer, whereupon the precipitate formed in process is filtered off and washed on the filter with ether and pentane. Twice recrystallized from anhydrous ethanol, it affords 3-(3-cyclopentylpropionyl) - 9 - methyl-3,9-diazabicyclo[4.2.1]nonane hydrochloride melting at approximately 233°. The product has the formula

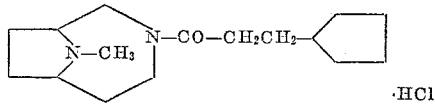

EXAMPLE 5

*3-acetoxy - 9 - methyl - 3,9 - diazabicyclo[4.2.1]nonane.*—To a solution of 20 parts of methyl chloroformate in 250 parts of ether is added, with vigorous agitation, a solution of 28 parts of 9-methyl-3,9-diazabicyclo[4.2.1]-nonane in 100 parts of ether. The resultant mixture is maintained with agitation at room temperatures for 1 hour, whereupon the mixture is partitioned between aqueous sodium hydroxide and ether. The ethereal phase, dried over anhydrous calcium sulfate and stripped of solvent by distillation, affords as the residue 3-acetoxy-9-methyl - 3,9 - diazabicyclo[4.2.1]nonane, having the formula

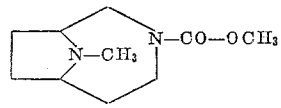

EXAMPLE 6

A. *3-isobutoxycarbonyl - 9 - methyl - 3,9 - diazabicyclo-[4.2.1]nonane hydrochloride.*—To a solution of 27 parts of isobutyl choroformate in 250 parts of ether is added, with vigorous agitation, a solution of 28 parts of 9-methyl - 3,9 - diazabicyclo[4.2.1]nonane in 100 parts of ether. The resultant mixture is maintained with agitation at room temperatures for 1 hour, whereupon the precipitate which forms is collected on a filter, washed thereon with ether, and recrystallized from a mixture of ethanol and ethyl acetate. The product which results is 3-isobutoxycarbonyl - 9 - methyl-3,9-diazabicyclo[4.2.1]nonane melting at 203–210°. It has the formula

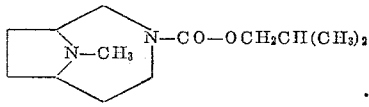

B. *9-ethoxycarbonylmethyl - 3 - isobutoxycarbonyl - 9-methyl - 3 - aza-9-azoniabicyclo[4.2.1]nonane bromide.*—A solution of 24 parts of 3-isobutoxycarbonyl-9-methyl-3,9-diazabicyclo[4.2.1]nonane hydrochloride and 16 parts of ethyl bromoacetate in 200 parts of anhydrous ethanol is heated at the boiling point under reflux for 7 hours, then allowed to stand at room temperatures overnight and finally poured into 3000 parts of ether. The solid precipitate thrown down is filtered off, washed with ether, and recrystallized from anhydrous ethanol to give 9-ethoxycarbonylmethyl - 3 - isobutoxycarbonyl - 9 - methyl-3-aza-9-azoniabicyclo[4.2.1]nonane bromide melting at approximately 125°.

C. *9-(p-bromobenzyl) - 3 - isobutoxycarbonyl-9-methyl 3-aza - 9 - azoniabicyclo[4.2.1]nonane bromide.*—Substitution of 25 parts of p-bromobenzyl bromide for the ethyl bromoacetate called for in Example 6B affords, by the procedure there detailed, 9-(p-bromobenzyl)-3-isobutoxycarbonyl - 9 - methyl-3-aza-9-azoniabicyclo[4.2.1]-nonane bromide melting at approximately 187°.

D. *9-(p-bromobenzoylmethyl) - 3 - isobutoxycarbonyl-9-methyl-3-aza-9-azoniabicyclo[4.2.1]nonane bromide.*—Substitution of 28 parts of p-bromophenylacetyl bromide for the ethyl bromoacetate called for in Example 6B affords, by the procedure there detailed, 9-(p-bromobenzoylmethyl)-3-isobutoxycarbonyl-9-methyl-3-aza - 9 - azoniabicyclo[4.2.1]nonane bromide melting at approximately 192°.

E. *9,9' - p - phenylenedimethylenebis{3-isobutoxycarbonyl-9-methyl-3-aza-9 - azoniabicyclo[4.2.1]nonane bromide} monohydrate.*—A solution of 30 parts of 3-isobutoxycarbonyl-9-methyl-3,9-diazabicyclo[4.2.1] - nonane and 16 parts of α,α'-dibromo-p-xylene in 150 parts of absolute ethanol is heated at the boiling point under reflux for 7 hours, then allowed to stand at room temperatures overnight and finally poured into 3000 parts of ether. The solid precipitate which forms is filtered off, washed with ether, and recrystallized from a mixture of aqueous 95% ethanol and ethyl acetate to give 9,9'-p-phenylenedimethylenebis 3 - isobutoxycarbonyl-9-methyl-3-aza-9-azoniabicyclo[4.2.1]nonane bromide monohydrate melting at 172–174°.

F. *9,9' - o - phenylenedimethylenebis{3-isobutoxycarbonyl-9-methyl-3-aza-9 - azoniabicyclo[4.2.1]nonane bromide} monohydrate.*—A solution of 36 parts of 3-isobutoxycarbonyl - 9 - methyl - 3,9 - diazabicyclo[4.2.1]nonane and 20 parts of α,α'-dibromo-o-xylene in 200 parts of absolute ethanol is heated at the boiling point under reflux for 7 hours, then allowed to stand at room temperatures overnight and finally poured into 3000 parts of ether. The solid precipitate thrown down is filtered off, washed with ether, and recrystallized from a mixture of aqueous 95% ethanol and ethyl acetate to give 9,9'-o-phenylenedimethylenebis{3 - isobutoxycarbonyl-9-methyl-3-aza-9-azoniabicyclo[4.2.1]nonane bromide} monohydrate melting at 181–183°.

What is claimed is:
1. A compound having the formula

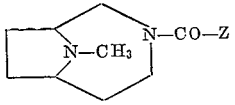

wherein Z represents a member of the class consisting of
 (a) the diphenylmethyl radical,
 (b) the benzyl radical,
 (c) a radical having the formula

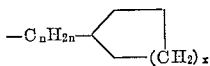

in which $n$ and $x$ each represent a positive integer less than 3, and
 (d) a radical having the formula —O—lower alkyl 2. 9-methyl - 3 - diphenylacetyl-3,9-diazabicyclo[4.2.1]-nonane.
3. 9 - methyl - 3 - phenylacetyl-3,9-diazabicyclo[4.2.1]-nonane.
4. 3 - (3 - cyclopentylpropionyl)-9-methyl-3,9-diazabicyclo[4.2.1]nonane.
5. 3 - isobutoxycarbonyl - 9 - methyl-3,9-diazabicyclo[4.2.1]nonane.

No references cited.